United States Patent

[11] 3,540,771

[72] Inventor Jerry L. Stoneburner
 P.O. Box 277, North Jackson, Ohio 44451
[21] Appl. No. 759,977
[22] Filed Sept. 16, 1968
[45] Patented Nov. 17, 1970

[54] INGOT CARRYING VEHICLE
 4 Claims, 2 Drawing Figs.
[52] U.S. Cl. .................................................. 296/1,
 214/82; 105/422
[51] Int. Cl. ................................................. B62d 33/00
[50] Field of Search ........................................ 296/23,
 26, 1, 27, 99, 100, 39.1; 214/82; 105/422

[56] References Cited
UNITED STATES PATENTS
| 2,795,539 | 7/1954 | Hughes | 105/422 |
| 3,342,523 | 9/1967 | Lutgen | 296/100 |
| 3,244,119 | 4/1966 | Garrett | 105/355 |

Primary Examiner—Philip Goodman
Attorney—Webster B. Harpman

ABSTRACT: An ingot carrying vehicle particularly adapted for transporting hot steel ingots and including a plurality of ingot receiving cradles, an insulated deck beneath said cradles and a plurality of telescopically slidable insulated cover sections and ends for completely enclosing said ingots whereby said ingots may be shipped without critical temperature loss.

Patented Nov. 17, 1970

INVENTOR.
JERRY L. STONEBURNER
BY
W. B. Hangman
ATTORNEY

INVENTOR.
JERRY L. STONEBURNER
BY
*W. B. Harpman*
ATTORNEY

INGOT CARRYING VEHICLE

BACKGROUND OF THE INVENTION

1. Field of the Invention

This invention relates to trucks and trailers and more particularly to insulated trailer constructions having closure means and adapted to handle hot metal ingots.

2. Description of the Prior Art

No prior art ingot carrying trailers are known and such vehicles including trucks and trailers as have been provided with closures have been concerned with weather protection rather than heat insulation. None of the prior art known can be used for hauling red hot metal ingots. This invention permits the transfer of red hot ingots from an ingot stripping operation in a steel mill, a soaking pit or otherwise directly to a rolling mill or the like for reduction of the ingot.

SUMMARY OF THE INVENTION

An insulated vehicle and specifically a truck trailer having an insulated deck and a plurality of ingot holding cradles thereon arranged for minimum contact with the ingots and several telescopically arranged progressively sized insulated inverted U-shaped cover sections movably mounted on said trailer so that the same can be opened while the red hot ingots are loaded on to the trailer and removed therefrom and so that they can be closed to completely enclose the ingots while the same are being transported by the trailer vehicle.

DESCRIPTION OF THE PREFERRED EMBODIMENT

Figure 1:
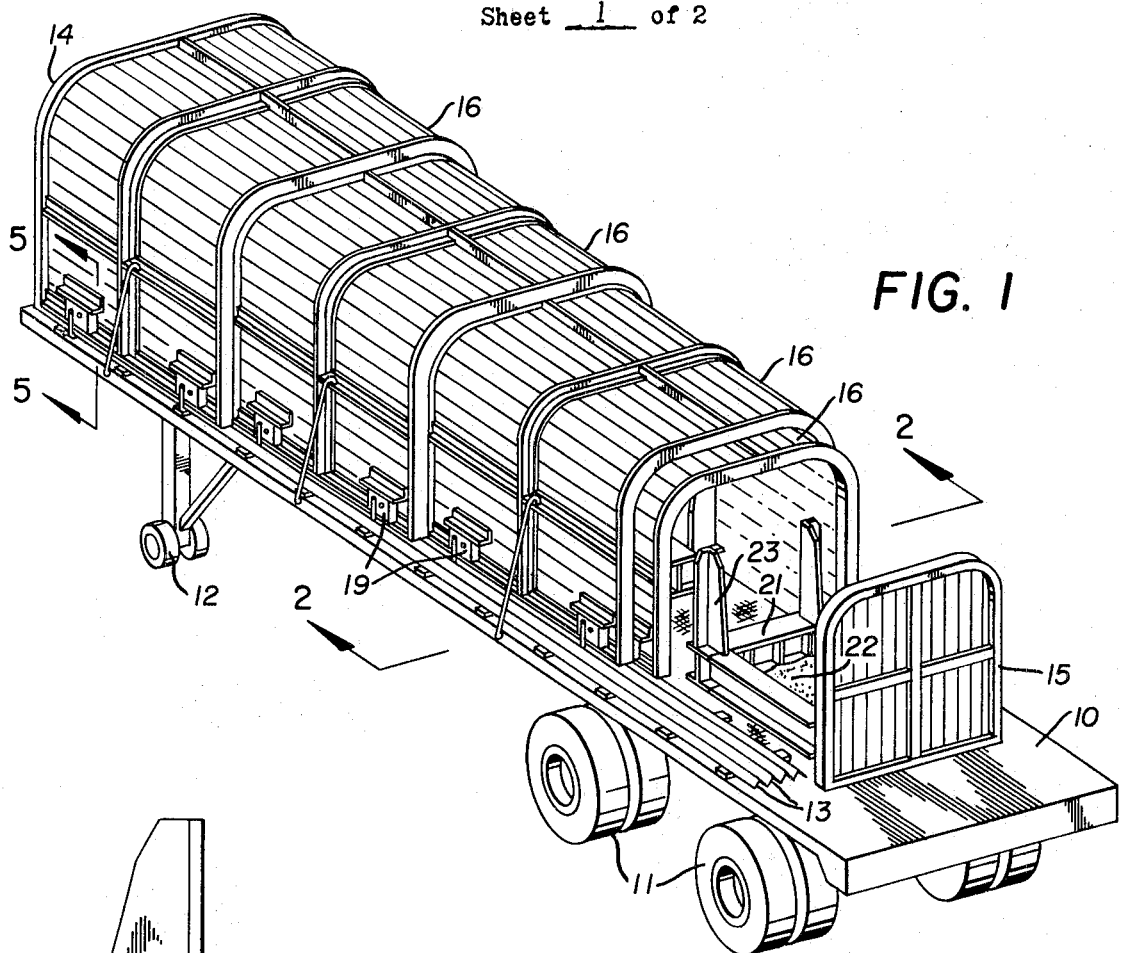
FIG. 1 is a perspective view of a trailer showing most of the insulated cover sections in closed position.

By referring to the drawings and FIG. 1 in particular, it will be seen that the ingot carrying vehicle disclosed herein takes the form of an over-the-road trailer having a deck 10 and ground engaging wheels 11. The wheels 11 are engaged on axle structures which are arranged in tandem beneath the trailer deck 10 as will be understood by those skilled in the art.

The forward end of the trailer is shown supported on a temporary dolly 12 which is foldable upwardly into retracted position when the trailer is positioned partially on a truck or tractor so as to be towed thereby as will occur to those skilled in the art.

The deck 10 of the trailer is formed of noncombustible materials and includes spaced rows of cross sectionally angle like rails 13 at either side thereof and extending longitudinally thereof. The deck 10 of the trailer has a fixed forward insulated wall 14 and a fixed rearward insulated wall 15 and a plurality of telescopically arranged movably positioned cover sections 16 positioned between the forward and rearward insulated walls 14 and 15 respectively and supported on the angle like rails 13.

Figure 5:
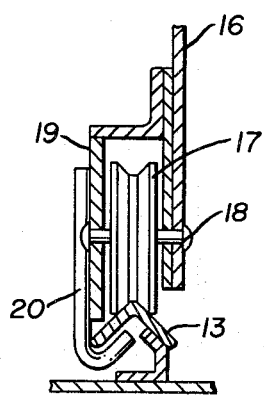
FIG. 5 is an enlarged cross section on line 5–5 of FIG. 1.

The support comprises a plurality of wheels of configurations registering with the angle like rails 13 as may best be seen in FIG. 5 of the drawings. These wheels 17 are journaled on axles 18 extending between the spaced walls of an axle box 19. A plurality of the axle boxes 19 are secured at spaced intervals along the bottom edges of the cover section 16 as best seen in FIG. 1 of the drawings.

Each of the axle boxes 19 is provided with a downwardly extending in turned and up turned hook 20 which is engaged in sliding relation beneath the respective angle like rail 13 on which that particular cover section 16 is positioned.

It will be seen that each of the cover sections 16 has a pair of the wheel carrying boxes 19 on the opposite sides thereof and that each of the cover sections 16 are of different widths and that each of the pairs of wheels on each of the sides thereof are therefore engaged on a different one of the angle like rails 13. Thus, every one of the cover sections 16 can be moved longitudinally of the trailer throughout its full length, irrespective of the position of any other one of the cover sections 16. This facilitates the loading and unloading of the ingots.

Still referring to FIG. 1 of the drawings, it will be observed that each of the three cover sections 16 shown in fully extended and covering position on the trailer deck 10 is secured by a binder clamp assembly engaging a middle frame thereof and the outermost edge of the deck 10 of the trailer. These binder clamp assemblies are manually operated and serve to hold the cover section 16 against accidental displacement as well as against longitudinal movement on the trailer during transport of the ingots therein. The binder clamp assemblies must be removed when the cover sections 16 are moved to permit access to the ingots on the trailer.

Figure 4:
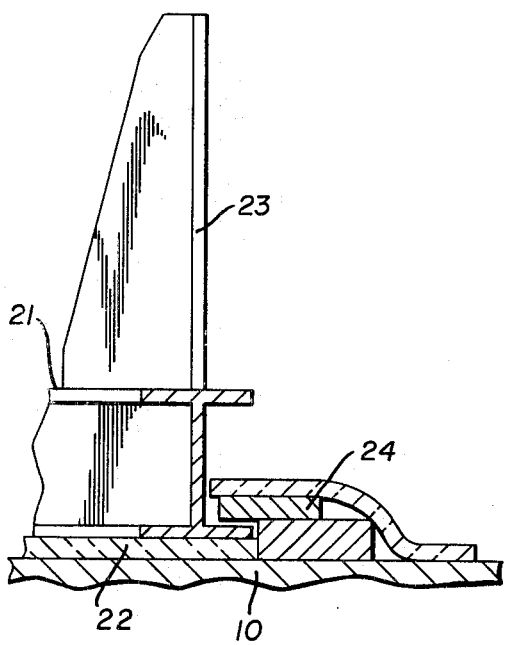
FIG. 4 is an enlarged cross section on line 4–4 of FIG. 2.
Figure 2:
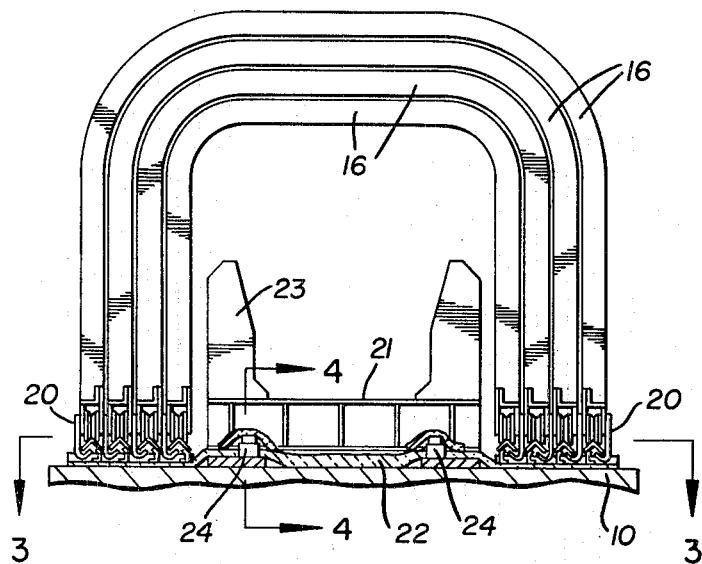
FIG. 2 is a vertical section on line 2–2 of FIG. 1.

By referring now to FIG. 2 of the drawings, it will be seen that a cross section has been illustrated which shows each of the plurality of cover sections 16 and their arrangement with respect to one another and the fact that the smallest of the cover sections 16 still provides adequate clearance for any one of a plurality of ingot receiving cradles 21 each of which cradles is positioned on the deck 10 of the trailer and spaced with respect thereto by suitable heat insulation 22 as best seen in FIG. 4 of the drawings.

The cradles 21 comprise rectangular frames including transverse members which directly receive the ingots and each of the corners of the rectangular frames of the cradles have vertical guides 23 which are tapered upwardly and outwardly adjacent their uppermost ends so that ingots being lowered there between are guided thereby into proper position on the cradles 21.

Figure 3:
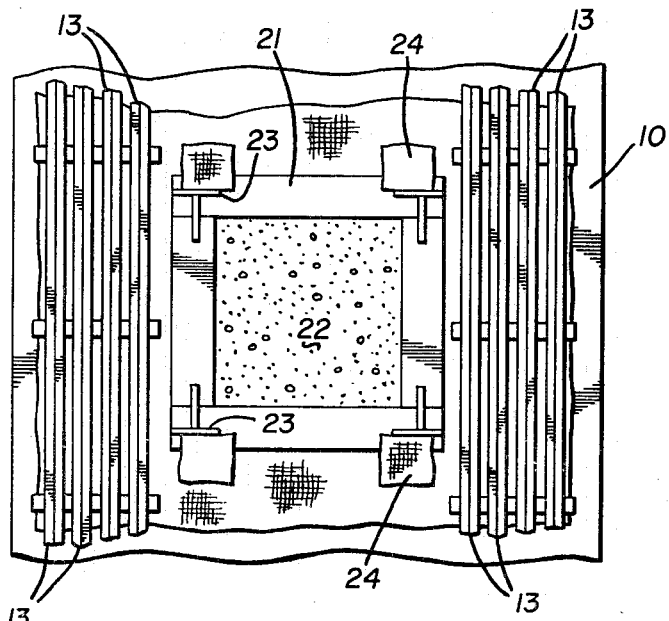
FIG. 3 is a horizontal section on line 3–3 of FIG. 2.

By referring now to FIGS. 3 and 4 of the drawings, it will be seen that the cradles 21 are held in desired position on the deck 10 by means of offset brackets 24 which engage the four corners of each of the cradles 21 and prevent it from shifting relative thereto. The offset brackets 24 are illustrated with coverings of suitable heat insulation material and the deck 10 of the trailer is also so covered and the inner surfaces of the fixed forward wall and the fixed rearward wall are also so covered.

A suitable insulation material for the purpose is an alumina silicate refractory fiber material such as commercially available under the trademark Fiberfrax or Kao-wool. The deck 10 of the trailer is also provided with an aluminum member having a polished upper surface providing a relatively high degree of reflective insulation with respect to heat radiation directed there against.

Those skilled in the art will observe that steel ingots as removed from an ingot mold or a soaking pit are frequently of a temperature approximating 2,100°F. and that if the ingots are to be reduced the temperature must be largely retained by the ingots when they reach the reduction facilities such as a rolling mill. By hauling the ingots in the trailer disclosed herein the heat of the ingots is largely retained as the entire device is constructed to prevent loss of heat of the ingots. At the same time, the structure of the trailer vehicle and the cover sections etc. are protected by the insulation from the high temperatures involved.

While four cover sections are shown on the trailer vehicle chosen for the purposes of illustration herein, it will occur to those skilled in the art that the number of cover sections may be varied so long as they are capable of movement to provide free and easy access to the cradles as upon the loading or unloading of ingots therefrom. It will also occur to those skilled in the art that the arrangement of the cover sections is such that they engage one another at their end sections when in extended or covering relation so as to prevent air leakage through the same which would otherwise cool the ingots being transported.

The front fixed insulated wall 14 and the rearward insulated wall 15 while noted as being fixed to the deck 10 of the trailer may obviously be movably disposed thereon so that they may be moved out of the way of a crane or other device loading ingots or removing ingots from the trailer vehicle if so desired.

The above described structure provides relatively easy and fast loading of hot ingots and their rapid covering and permits economical and efficient truck transport of the ingots from their place of formation to a rolling mill or other facility which may, therefore, be located at some distance from the point of origin.

Although but one embodiment of the present invention has been illustrated and described, it will be apparent to those skilled in the art that various changes and modifications may be made therein without departing from the spirit of the invention.

I claim:

1. A vehicle for transporting hot ingots and consisting of a supporting structure having ground engaging wheels, a plurality of cradles positioned on said supporting structure and insulated with respect thereto and a plurality of telescopically engageable slidable insulated cover sections on said vehicle arranged to enclose said cradles and ingots therein and forward and rearward insulated wall sections for closing the ends of said cover sections.

2. A vehicle for transporting hot ingots set forth in claim 1 and wherein the cover sections are insulated with alumina silicate fiber insulation and incorporate closure means between the respective sections when in extended ingot covering position.

3. The vehicle for transporting hot ingots set forth in claim 1 and wherein said structure has a plurality of rails positioned longitudinally thereof along each of the longitudinal sides thereof and wherein said cover sections have supporting wheels pivoted thereto engaged on said rails together with means on said cover sections engaging said rails in oppositely disposed relation to said wheels to retain said cover sections in position thereon.

4. The vehicle for transporting hot ingots set forth in claim 1 and wherein each of said cradles includes a rectangular base and vertically extending ingot engaging and retaining members on each of the corners of said base and wherein the portions of the cradle engaging the ingot are a relatively small area with respect to the cradle and the ingot.